United States Patent [19]
Raffel

[11] Patent Number: 5,966,642
[45] Date of Patent: *Oct. 12, 1999

[54] METHOD AND APPARATUS FOR MAINTAINING CHANNEL PRIORITY IN A MULTIPLE WIRELESS COMMUNICATION SYSTEM ENVIRONMENT

[75] Inventor: Michael Allen Raffel, Redmond, Wash.

[73] Assignee: AT&T Wireless Services Inc., Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/672,898
[22] Filed: Jun. 28, 1996
[51] Int. Cl.$^6$ ..................................................... H04B 7/00
[52] U.S. Cl. ........................................... 455/51; 455/455
[58] Field of Search ........................... 455/63, 67.3, 422, 455/426, 449, 450, 452, 454, 455, 512, 520

[56] References Cited

U.S. PATENT DOCUMENTS

| | | | |
|---|---|---|---|
| 5,054,109 | 10/1991 | Blackburn | 455/512 |
| 5,101,502 | 3/1992 | Felderman et al. | 455/520 |
| 5,222,247 | 6/1993 | Breeden | 455/26.1 |
| 5,235,632 | 8/1993 | Raith | 379/59 |
| 5,319,641 | 6/1994 | Fridrich et al. | 370/85.3 |
| 5,319,796 | 6/1994 | Grube et al. | 455/520 |
| 5,475,866 | 12/1995 | Ruthenberg | 455/454 |
| 5,638,055 | 6/1997 | McDonald et al. | 455/520 |
| 5,659,881 | 8/1997 | Kent | 455/520 |

FOREIGN PATENT DOCUMENTS

| | | | |
|---|---|---|---|
| 2 270 815 | 3/1994 | United Kingdom | H04Q 7/04 |
| 2 288 102 | 10/1995 | United Kingdom | H04Q 7/20 |

Primary Examiner—Reinhard J. Eisenzopf
Assistant Examiner—Marsha D. Banks-Harold

[57] ABSTRACT

A method and system are disclosed for a transmitter to maintain priority on a communication channel in a multiple wireless communication system environment. An exemplary method for maintaining priority includes transmitting a priority signal to maintain priority for the transmitter on the communication channel. The priority signal may be pseudo-random noise (PRN) signals. In one embodiment, the PRN signals are transmitted in response to activity sensed on the communication channel, one cause of which may be a contending transmitter transmitting on the communication channel. In this embodiment the step of transmitting is for a predetermined duration and causes the contending transmitter to stop transmitting on the communication channel. In an alternate embodiment, the transmission of the PRN signals is periodic and occurs sufficiently often to cause the contending transmitter to abstain from ever transmitting on the communication channel.

30 Claims, 3 Drawing Sheets

METHOD AND APPARATUS FOR MAINTAINING CHANNEL PRIORITY IN A MULTIPLE WIRELESS COMMUNICATION SYSTEM ENVIRONMENT

TECHNICAL FIELD

This invention relates generally to a method and apparatus for a transmitter to maintain priority on a communication channel in a multiple wireless communication system environment.

BACKGROUND

Wireless communications in general and, wireless cellular communications systems in particular, are becoming increasingly popular. Cellular communication systems are well known, and generally include cell sites, each of which serves a coverage area or cell. The cell site is the location within a cell that contains the hardware (e.g. an antenna, a radio base station, etc) required to communicate with a mobile end unit (e.g. a wireless mobile phone). The entire area over which service is provided is generally subdivided into a plurality of such cell sites, and channels are allocated to each cell site in accordance with a frequency reuse plan. A mobile end unit operating within a particular cell communicates with the cellular system through the cell site covering that cell. The various cell sites are typically connected either directly or, indirectly, to a land-line network, such as the public switched telephone network (PSTN).

Cellular communications systems originally were used to provide analog mobile telephone services. Today, cellular communications systems are used to provide a wide variety of wireless communication services. As used herein, the term wireless communication service is used to identify any logically discreet use of the wireless spectrum. Examples of such wireless services include analog mobile telephone service, digital mobile telephone service, personal base station (PBS) service, cellular office service (COS), and cellular digital packet data (CDPD) service. Personal base station service is provided using a PBS, which is a device that allows a cellular telephone to function as a cordless land-line telephone when used in the vicinity of the PBS. A PBS is usually located in the home and serves the cellular telephones within that home. COS is similar to PBS service, however COS is intended for use in an office environment as a wireless PBX. Accordingly, COS systems typically serve many more cellular telephones than does a PBS. A CDPD network is comparable to the cellular telephone network, except that data, rather than voice, is communicated between a mobile end unit and the PSTN or some other type of data network such as the Internet.

Wireless communication service providers are generally licensed to operate a wireless system in a particular geographic area using a specified frequency spectrum for radio communication between mobile end units and base stations. For example, a typical wireless service provider may have a license to operate in a 25 MHz spectrum. One-half of the spectrum (12.5 MHz) would be used for transmission by the base stations and the other half would be used for reception by the mobile end units. The 25 MHz spectrum may be divided into 416 channel pairs, each channel being 30 kHz wide. Each of the 416 channel pairs is capable of handling the communication between one mobile end unit and a base station. As indicated above, the wireless service providers are increasing the types of wireless services they provide and, the radio spectrum they license (e.g. 25 MHz, as in the instant example) must be shared among those different services.

For example, the wireless service provider, in addition to offering analog or digital cellular telephone service, may also provide PBS, COS and/or CDPD service. Analog or digital cellular telephone service is provided through the use of public cell sites. As discussed above, the entire area over which service is provided is subdivided into a plurality of such cell sites, and channels are allocated to each cell site in accordance with a frequency reuse plan, whereby customers in sufficiently separated cell sites use identical channels of communication without suffering any interference with each other. Because radio spectrum is a scarce resource, typically only 3 or 4 channels can be allocated to each cell site in such a system. The term "macrocellular system" is used hereinafter to refer to cellular systems with relatively large cell sites, such as an analog or digital cellular telephone system. The term "microcellular system" is used to refer to cellular systems with relatively small cell sites, such as PBS, COS, and sometimes CDPD systems, within the coverage area of the macrocellular system. The channels available to a microcellular system encompass a subset of the entire spectrum (i.e. not including, for example, testing channels, analog control channels, etc.) that the wireless service provider is licensed to use. A problem can arise when a system, which is not explicitly frequency planned, "pops-up" within the area serviced by a macrocellular system and begins using spectrum already allocated to the macrocellular system.

Consider a conventional radio base station of a macrocellular system that transmits and receives on its assigned forward and reverse channel pairs. In addition to monitoring the received signal strength (RSS) for information and/or interference on the reverse channel while transmitting on the forward channel, the base station also monitors the reverse channel (and/or the forward channel) at times when it is not transmitting on the forward channel and, accordingly, is not expecting to receive information on the reverse channel (and/or the forward channel). If the RSS on any one of its assigned channels not currently in use is above a predetermined threshold, indicating conflicting activity on the channel (one cause of which may be a cellular phone in a microcellular system establishing communication on the channel), the base station may react in a manner that negatively impacts its overall performance. For example, the base station may stop using the channel entirely, in which case, the base station may be left with an insufficient number of channels to handle call traffic during peak calling hours. The base station may alternatively ignore the disruptive use by the microceflular system and, may eventually assign one of its own calls to the channel. The microcellular system, like the radio base station of the macrocellular system, typically monitors the channel it is currently using for potential conflicting use and, will stop using the channel if conflicting use is detected thereon. Thus, although the base station's assignment of a call to the channel ideally will "scare away" the microcellular system, the microcellular system's delay in surrendering the channel will noticeably degrade the sound quality of the macrocellular system's call and vice versa.

SUMMARY OF INVENTION

The above-identified problems are solved and a technical advance is achieved in the art by providing a method and apparatus for a transmitter to maintain priority on a communication channel in a multiple wireless communication system environment. An exemplary method for maintaining priority includes transmitting a priority signal to maintain priority on the communication channel.

In one embodiment, the transmitter, when otherwise not transmitting on the communication channel, monitors the channel for activity, one cause of which may be a contending transmitter attempting to establish a call on the channel. In response to detected activity on the channel, the transmitter transmits a priority signal thereon. The priority signal may be a pseudo-random noise signal. In this embodiment, the priority signal is transmitted for a predetermined duration and causes the contending transmitter, which is also monitoring the channel for activity, to stop transmitting on the channel. In an alternate embodiment, transmission of the priority signal is periodic and occurs sufficiently often to cause the contending transmitter to abstain from ever attempting to transmit on the communication channel.

Other and further aspects of the present invention will become apparent during the course of the following description and by reference to the attached drawings.

DETAILED DESCRIPTION

Figure 1:
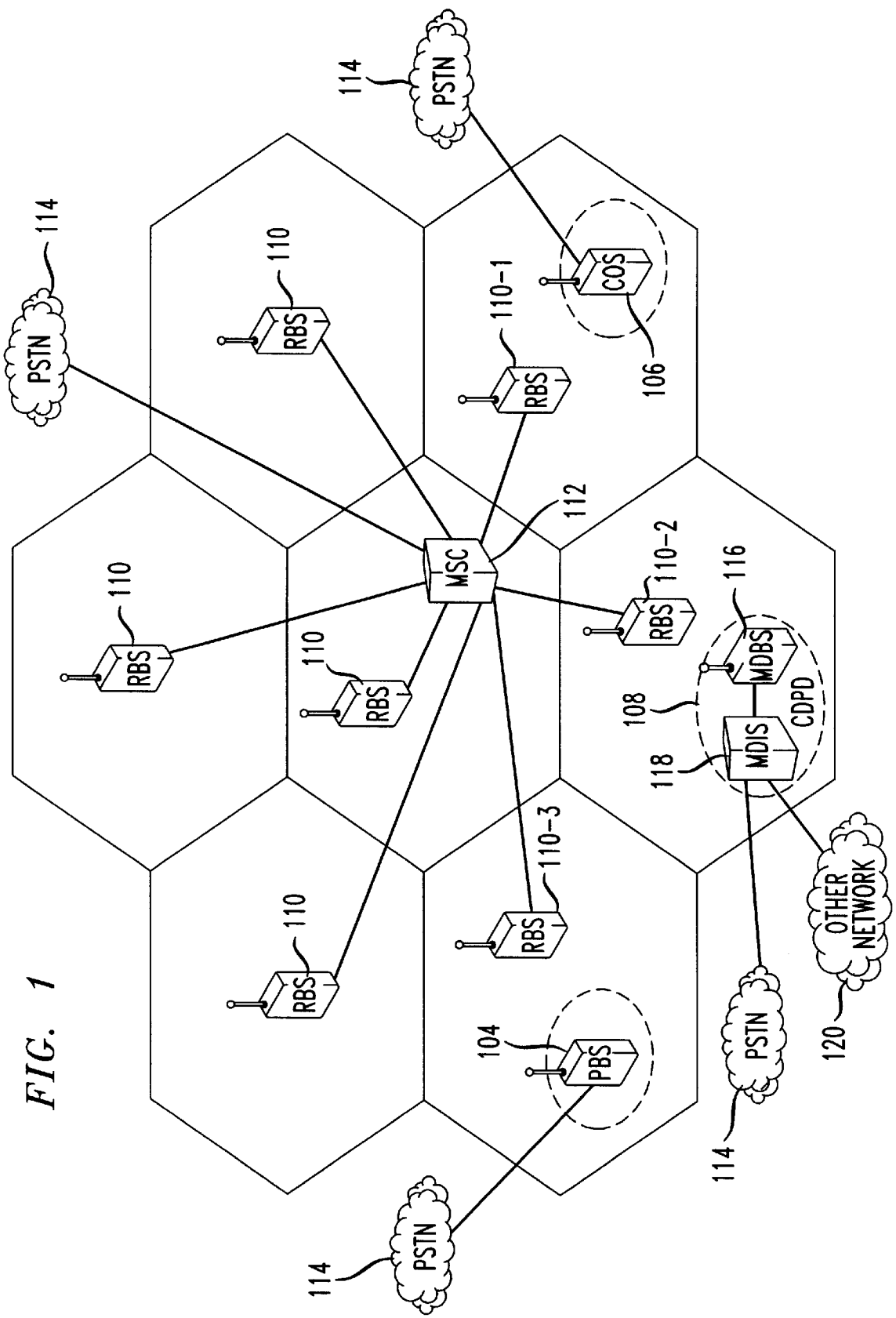
FIG. 1 is a block diagram illustrating a macrocellular system and a plurality of microcellular systems.

Referring now to the drawings wherein like reference numbers refer to like parts, FIG. 1 is a block diagram of a macrocellular communication system and multiple microcellular systems. FIG. 1 shows a cellular telephone network (including a plurality of radio base stations (RBSs) 110 and a Mobile Switching Center (MSC) 112), a personal base station (PBS) 104, a cellular office service (COS) system 106, and a cellular digital packet data (CDPD) network 108.

The cellular telephone network comprises a plurality of RBSs 110, each of which is in communication with an MSC 112. Such communication may be provided by a direct connection between the RBS 110 and the MSC 112, as shown in FIG. 1. Such cellular telephone networks are well-known in the art, and the detailed operation and architecture of such a system will not be discussed herein.

As is also well-known in the art, the MSC 112 controls the functioning of the RBSs 110. Such control typically includes the assignment of radio channels which each RBS 110 will use to communicate with mobile end units (not shown), such as mobile cellular telephones. As previously discussed, each RBS 110 is typically assigned a small subset of the channels that the wireless service provider is licensed to use. The MSC 112 is connected to the public switched telephone network (PSTN) 114, such that a mobile end unit may communicate with a land line telephone.

The PBS 104 shown in FIG. 1, may actually comprise a plurality of PBS devices (not shown) which are connected to the PSTN 114. A PBS is a device that allows a cellular telephone to function as a cordless land-line telephone when used in the vicinity of the PBS 104. The system allows a user of the cellular telephone to communicate with other land line telephones through the PSTN 114 and other cellular phones. The PBS 104 chooses a channel that will be used for communication between the PBS 104 and the cellular telephone. A list of possible channels from which the PBS 104 may choose is stored in the PBS 104. This list is commonly referred to as a "pick-list" and, may be prestored or, in the alternative, updated periodically by connection to a private access visitor location register (PA-VLR)(not shown) through the PSTN 114. The pick fist typically encompasses most of the frequency spectrum that the wireless service provider is licensed to use. Therefore, as discussed below, the PBS 104 could potentially select a channel for transmission that is already assigned to an RBS 110 near which the PBS 104 resides. A PBS network is described in detail in U.S. patent application Ser. No. 08/526,066, entitled Wireless Communication System, filed Sep. 8, 1995, which is incorporated herein by reference.

The COS system 106 is similar to a wireless private branch exchange (PBX) installed in an office-type environment and comprises a plurality of fixed stations (not shown) that are connected to the PSTN 114. The fixed stations permit cellular telephones used in the office to function as land-line or PBX extension telephones. As in the case of a PBS 104, the COS system 106 allows a user of the cellular telephone to communicate with other land line telephones through the PSTN 114. Like the PBS 104, the COS system 106 uses a pick list that typically encompasses the entire radio spectrum that the wireless service provider is licensed to use.

The CDPD network 108 comprises one or more mobile data base stations (MDBS) 116 in communication with a mobile data intermediate system (MDIS) 118. A CDPD network is described in detail in Cellular Digital Packet Data System Specification, Release 1, Jul. 19, 1993, CDPD System Specification, 650 Town Center Drive, Suite 820, Costa Mesa, Calif. 92626, which is incorporated herein by reference. As is well known in the art, the MDIS 118 controls the functioning of the MDBSs 116. Such control includes the assignment of radio channels, which each MDBS 116 will use to communicate with mobile end units (not shown). An example of a mobile end unit in a CDPD network 108 includes a wireless mobile data terminal. The MDIS 118 is connected to a network, such as the PSTN 114 or the Internet 120, so that the mobile end unit may communicate with a land line device or other mobile device.

Figure 2:
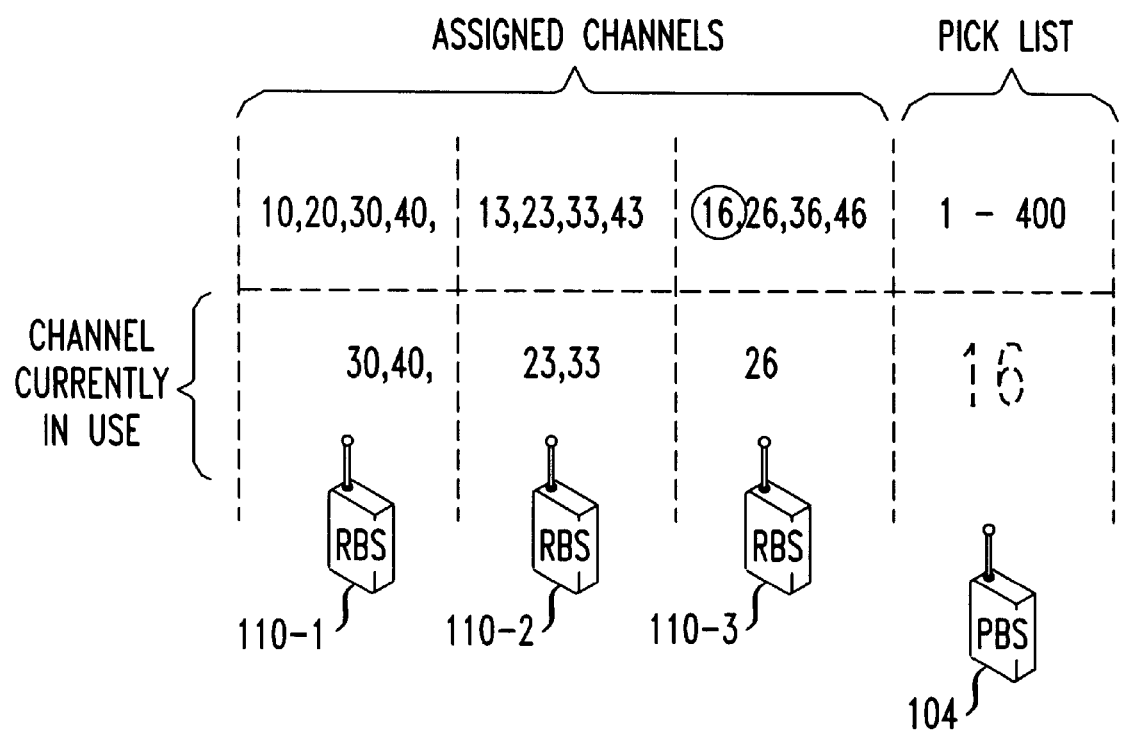
FIG. 2 is a block diagram illustrating the interplay between a macrocellular system and a microcellular system.

FIG. 2 illustrates the interplay between a macrocellular system, such as a cellular telephone system, and a microcellular system, such as a PBS 104. FIG. 2 shows the RBSs 110 of a cellular telephone system and their respective RF channel assignments together with an indication of channels currently in use. RBS 110-1 is assigned channels 10, 20, 30 and 40, of which channels 30 and 40 are currently in use. RBS 110-2 is assigned channels 13, 23, 33 and 43, of which channels 23 and 33 are currently in use. RBS 110-3 is assigned channels 16, 26, 36 and 46, of which channel 26 is currently in use. FIG. 2 also shows a microcellular system, which for purposes of illustration, is the PBS 104. The PBS 104 is assumed to reside within the coverage area of RBS 110-3, as shown in FIG. 1. It is also assumed that the wireless service provider is licensed to use 25 MHz of spectrum and thus, that the PBS's pick list consists of most of the available channel pairs. The PBS 104 constantly monitors these channels for conflicting activity and selects the clearest channel. As such, the PBS 104 may choose to transmit on channel 16, which is assigned to RBS 110-3 but not currently in use. As previously discussed, a conventional base station such as RBS 110-3 in FIG. 2, sensing conflicting activity or use on that channel, may stop use of the channel entirely, at the expense of not having enough channels on which to transmit during peak calling hours. The RBS 110-3 may, in the alternative, ignore the disruptive use by the PBS 104. This may eventually result in RBS 110-3 haphazardly assigning a call to that channel, at the same time that the PBS 104 is transmitting on channel 16. Although the RBS's 110-3 assignment of a call to channel 16, will in all likelihood eventually cause the PBS 104 to abdicate use of channel 16

(the PBS 104 will sense conflicting use thereon and stop using the channel), the inevitable delay associated with such abdication will result in a noticeable degradation in the sound quality or communication link for either system. It should be noted that the PBS 104 alternatively could have chosen to transmit on a channel assigned to, and in use by, a more remote base station, such as RBS 110-2 or RBS 110-1, and that doing so could have negatively affected those RBSs in a similar manner.

Figure 3:
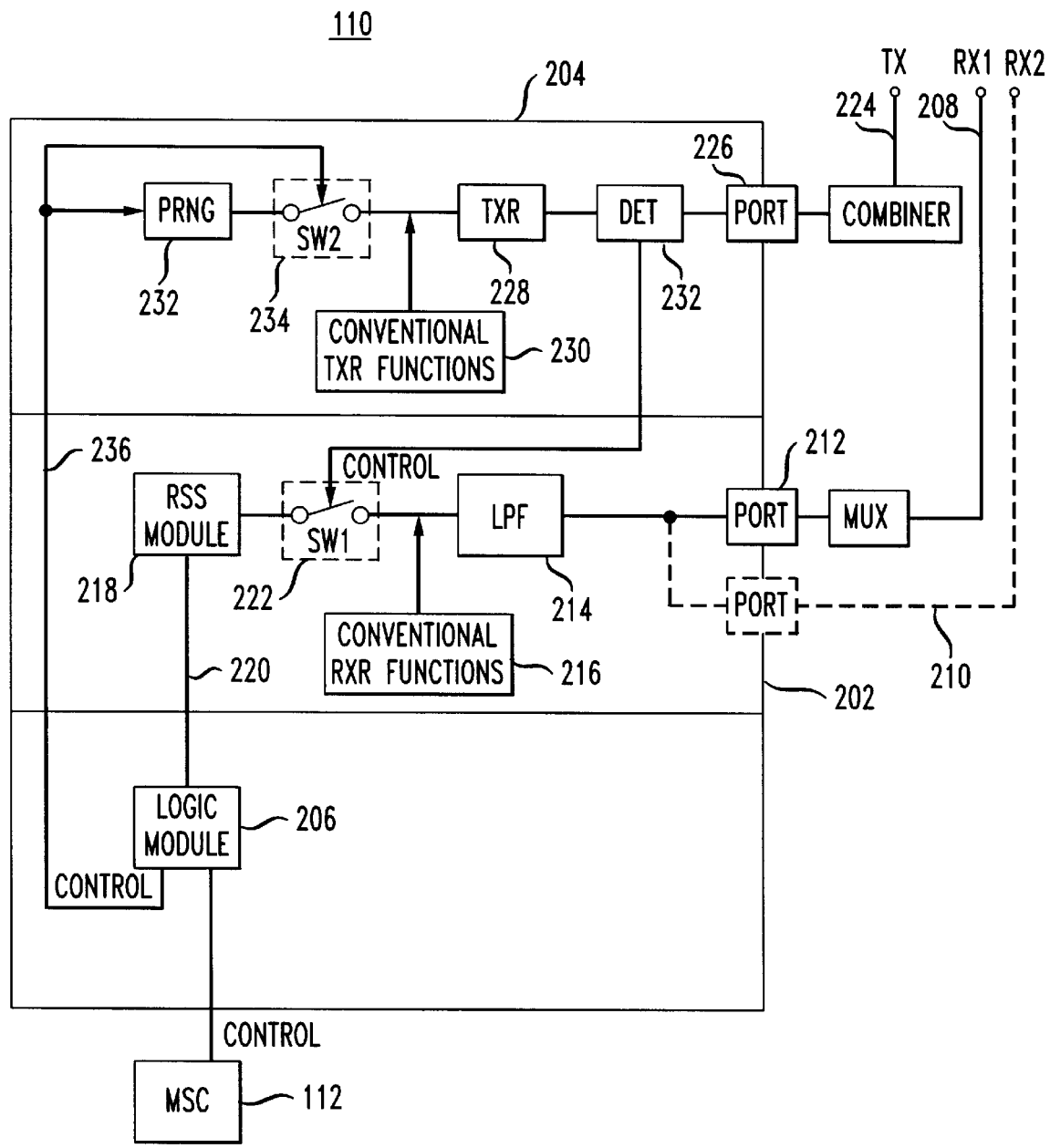
FIG. 3 is a block diagram of an exemplary radio base station of the instant invention.

FIG. 3 is a block diagram of an exemplary base station 110 of the instant invention, which solves the above-identified problems in the prior art. FIG. 3 shows a receiver portion 202, a transmitter portion 204 and a logic module 206. The base station 110 is connected to an MSC 112, which, as is well known in the art, controls the functioning of the base station 110. For example, the MSC 112 typically assigns radio channels to the base station 110, which the base station 110 then uses for communication with mobile end units. Moreover, the logic module and the functions performed thereby, although shown in FIG. 3 as residing in the RBS 110, can alternatively reside in the MSC 112.

The receiver portion 202 of the base station comprises an antenna 208 (with optional diversity 210), RF ports 212, a low pass filter (LPF) 214 and other conventional receiver circuitry 216 (the details of which are well known and, accordingly, are not shown). The receiver portion 202 also comprises a module 218 for measuring the received signal strength (RSS). This module 218 is connected to the logic module 206 via line 220 and is connectable to the LPF 214 via a first switch 222.

The transmitter portion 204 comprises an antenna 224, RF ports 226, a transmitter 228, and other conventional transmitter circuitry 230 (once again, the details of which are well known and thus, not shown). The transmitter portion 204 further comprises a module 232 connected to the output of the transmitter 228 for detecting whether the transmitter 228 is "on" or "off. " It should be noted that rather than physically attaching such a module 232 to the output of the transmitter 228, the "detecting" function can be implemented entirely in software, elsewhere. The transmitter 228 is further connectable to a pseudo-random noise generator (PRNG) 232 via a second switch 234. Both the PRNG 232 and second switch 234 are connected to the logic module 206 via a control line 236.

Upon detecting that the transmitter 228 is "off" (i.e. not transmitting), the detector module 232 closes the first switch 222, thus permitting the RSS module 218 to measure the received signal strength on its assigned channels (the RSS measured may be for the forward and/or the reverse channel of the assigned channel pairs). These measurements are transmitted via line 220 to the logic module 206. The logic module 206 comprises a central processing unit (CPU) (not shown) and a memory unit (also not shown) together with a computer program executed by the CPU. If the logic module 206 determines that the received signal strength is above a predetermined threshold, indicating conflicting use or activity on a channel (one cause of which may be a microcellular system, e.g. PBS 104 or a cellular phone thereat, transmitting, or attempting to transmit, on the channel), the logic module 206, via control line 236, activates the PRNG 232 for a predetermined duration and triggers the second switch 234. This results in the transmission of PRN signals on the channel. The transmission of PRN signals on the channel or, the transmission of some other signals when the RBS 110 of the macrocellular system is otherwise not handling a call on the channel, is hereinafter referred to as transmitting a priority signal. The use of a PRN signal as a priority signal is for purposes of illustration only and, is in no way intended to be limiting. The duration of the priority signal must be sufficient to cause the microcellular system (e.g. PBS 104) to abdicate further use of the channel to the radio base station 110. When transmitting, the microcellular system 104 monitors the channel for potential conflicting activity and, once detected, will move to another channel, thereby abdicating use of the channel to the base station 110. What constitutes a "sufficient" duration is programmed into the logic module 206 of the base station 110 as well as into a comparable module (not shown) in the microcellular system 104.

In an alternate embodiment, the logic module 206 activates the PRNG 232 periodically, irrespective of the RSS on the assigned channels. For example, the logic module may simply transmit a priority signal every hour. The periodicity of the priority signal transmissions must be sufficient to cause the microcellular system (e.g. PBS 104) to abstain from attempting to transmit on the channel. This periodicity is pre-programmed into the logic module 206 of the radio base station 110 as well as a comparable module (not shown) in the microcellular system 104. The microcellular system 104 is programmed to collect a "priority signal history" for the channel (typically a day's worth of data) and will abstain from transmitting on the channel if the periodicity of priority signal transmissions, as evidenced by the priority signal history, equals or exceeds the pre-programmed periodicity.

In the foregoing embodiments, a radio base station of a macrocellular system has transmitted a priority signal in order to maintain channel priority in the face of contending microcellular systems. The transmission of a priority signal is effective because a master-slave relationship is established between the radio base station of the macrocellular system and one or more microceilular systems. Therefore, in an alternate embodiment, in addition to the radio base station of the macrocellular system transmitting a priority signal to maintain channel priority with respect to a plurality of microcellular systems (e.g. a COS system and a PBS), one of the microcellular systems (e.g. the COS system) may also transmit a priority signal in the manner previously described to maintain channel priority with respect to the other microcellular system (e.g. the PBS). Although three levels of priority signaling are described herein, there could be, in other embodiments of the instant invention, any number of such levels.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims. For example, one of ordinary skill in the art will recognize that the instant invention is equally applicable where the macrocellular system is merely defined as one type of cellular system (e.g. a COS system), and the microcellular system is defined as another type of cellular system (e.g. a PBS).

I claim:

1. A method for a transmitter of a first cellular system that handles telephone calls on a communication channel to maintain priority on the communication channel over a contending transmitter of a second cellular system, comprising:

transmitting a priority signal on the communication channel while the first cellular system is not simultaneously handling a call on the communication channel, thereby maintaining priority on the communication channel over the contending transmitter.

2. The method of claim 1 wherein the priority signal is a pseudo-random noise signal.

3. The method of claim 1 further comprising the steps of detecting activity on the communication channel and transmitting the priority signal in response thereto.

4. The method of claim 3 wherein the activity is caused by a contending transmitter transmitting on the communication channel.

5. The method of claim 4 wherein the step of transmitting is for a predetermined duration and causes the contending transmitter to stop transmitting on the communication channel.

6. The method of claim 5 wherein the predetermined duration is based upon knowledge of the behavior of the contending transmitter.

7. The method of claim 3 wherein the step of transmitting is initiated when the activity is above a predetermined threshold.

8. The method of claim 1 wherein the step of transmitting is periodic and occurs sufficiently often to cause the contending transmitter to abstain from ever transmitting on the communication channel.

9. The method of claim 8 wherein the period of the transmitting is based upon knowledge of the behavior of the contending transmitter.

10. A radio of a first cellular system that handles telephone calls on a communication channel, the radio comprising:
a transmitter for transmitting a priority signal on the communication channel while the first cellular system is not simultaneously handling a call on the communication channel, thereby maintaining priority for the radio on the communication channel over a contending transmitter of a second cellular system.

11. The apparatus of claim 10 further comprising a logic module operatively coupled to the transmitter for controlling the transmission of the priority signal.

12. The apparatus of claim 11 further comprising:
a received signal strength (RSS) module operatively coupled to the logic module for detecting activity on the communication channel, wherein the logic module, in response to the activity, directs the transmitter to transmit the priority signal.

13. The apparatus of claim 12, wherein the activity is caused by the contending transmitter transmitting on the communication channel.

14. The apparatus of claim 13 wherein the logic module directs the transmitter to transmit the priority signal for a predetermined duration so as to cause the contending transmitter to stop transmitting on the communication channel.

15. The apparatus of claim 13 wherein the logic module directs the transmitter to transmit the priority signal periodically and sufficiently often to cause the contending transmitter to abstain from ever transmitting on the communication channel.

16. The apparatus of claim 12 wherein the logic module directs the transmitter to transmit the priority signal when the activity is above a predetermined threshold.

17. A system for enabling a first cellular system that handles telephone calls on a communication channel to maintain priority on the communication channel over a second cellular system, comprising:
a first cellular system having a transmitter which transmits a priority signal on the communication channel while the first cellular system is not simultaneously handling a call on the communication channel; and
a second cellular system having a first module for detecting the priority signal on the communication channel and, a first logic module for controlling use of the communication channel by the second cellular system, wherein the logic module, in response to the detection of the priority signal, directs the second cellular system not to transmit on the communication channel.

18. The system of claim 17, wherein the first cellular system is a macrocellular system and the second cellular system is a microcellular system.

19. The system of claim 17, wherein the priority signal is a pseudo-random noise signal.

20. The system of claim 17, wherein the first cellular system further comprises:
a second logic module operatively coupled to the transmitter for controlling transmission of the priority signal; and
a received signal strength (RSS) module operatively coupled to the logic module for detecting activity on the communication channel, wherein the second logic module, in response to the activity, directs the transmitter to transmit the priority signal.

21. The system of claim 20, wherein the second logic module directs the transmitter to transmit the priority signal when the activity is above a predetermined threshold.

22. The system of claim 20, wherein the second logic module directs the transmitter to transmit the priority signal for a predetermined duration so as to cause the second cellular system to stop transmitting on the communication channel.

23. The system of claim 17, wherein the first cellular system further comprises a second logic module operatively coupled to the transmitter for controlling transmission of the priority signal, and the second logic module directs the transmitter to transmit the priority signal periodically and sufficiently often to cause the second cellular system to abstain from ever transmitting on the communication channel.

24. A method for enabling a first cellular system that handles telephone calls on a communication channel to maintain priority on the communication channel over a second cellular system, comprising:
the first cellular system transmitting a priority signal on the communication channel while the first cellular system is not simultaneously handling a call on the communication channel; and
the second cellular system detecting the priority signal and, in response thereto, not transmitting on the communication channel.

25. The method of claim 24, further comprising: the first cellular system detecting activity on the communication channel and, in response thereto, transmitting the priority signal.

26. The method of claim 25, wherein the priority signal is transmitted when the activity is above a predetermined threshold.

27. The method of claim 25, wherein the priority signal is transmitted for a predetermined duration so as to cause the second cellular system to stop transmitting on the communication channel.

28. The method of claim 24, wherein the priority signal is transmitted periodically and sufficiently often to cause the second cellular system to abstain from ever transmitting on the communication channel.

29. A system for enabling a cellular communication system to maintain priority on a communication channel, comprising:

a first cellular system;

a second cellular system for handling telephone calls on a first communication channel, the second cellular system having a transmitter for transmitting a first priority signal on the first channel with the second cellular system is not simultaneously handling a call on the first channel, to maintain priority on the first channel over the first cellular system; and a third cellular system for handling telephone calls on a second communication channel, the third cellular system having a transmitter for transmitting a second priority signal on the second channel while the third cellular system is not simultaneously handling a call on the second channel, to maintain priority on the second channel over the first and second cellular systems.

30. The system of claim 29, wherein the first cellular system includes a first module for detecting the first priority signal on the first communication channel and, a first logic module for controlling the first cellular system's transmission on the first communication channel, wherein the logic module, in response to the detection of the first priority signal, directs the first cellular system not to transmit on the first communication channel.

* * * * *

UNITED STATES PATENT AND TRADEMARK OFFICE
CERTIFICATE OF CORRECTION

PATENT NO. : 5,966,642
DATED : October 12, 1999
INVENTOR(S) : Michael Allen Raffel It is certified that error appears in the above-identified patent and that said Letters Patent is hereby corrected as shown below:

Column 2,
Line 46, "microceflular" should read -- microcellular --.

Column 3,
Line 67, "pick fist" should read -- pick list --.

Column 6,
Line 33, "microceilular" should read -- microcellular --.

Column 9,
Line 8, "with" should be -- while --.

Signed and Sealed this

Twenty-third Day of April, 2002

Attest:

Attesting Officer

JAMES E. ROGAN
Director of the United States Patent and Trademark Office